June 19, 1934.   G. M. JENNINGS   1,963,440
OVERLOAD CUSHIONING DEVICE FOR MOTOR VEHICLES
Filed July 17, 1933
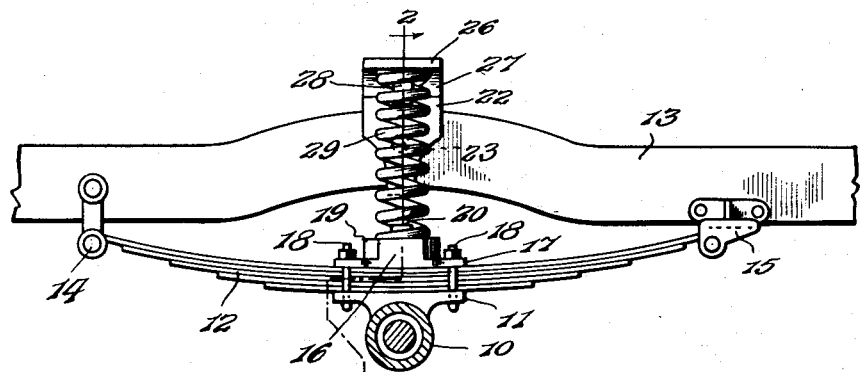
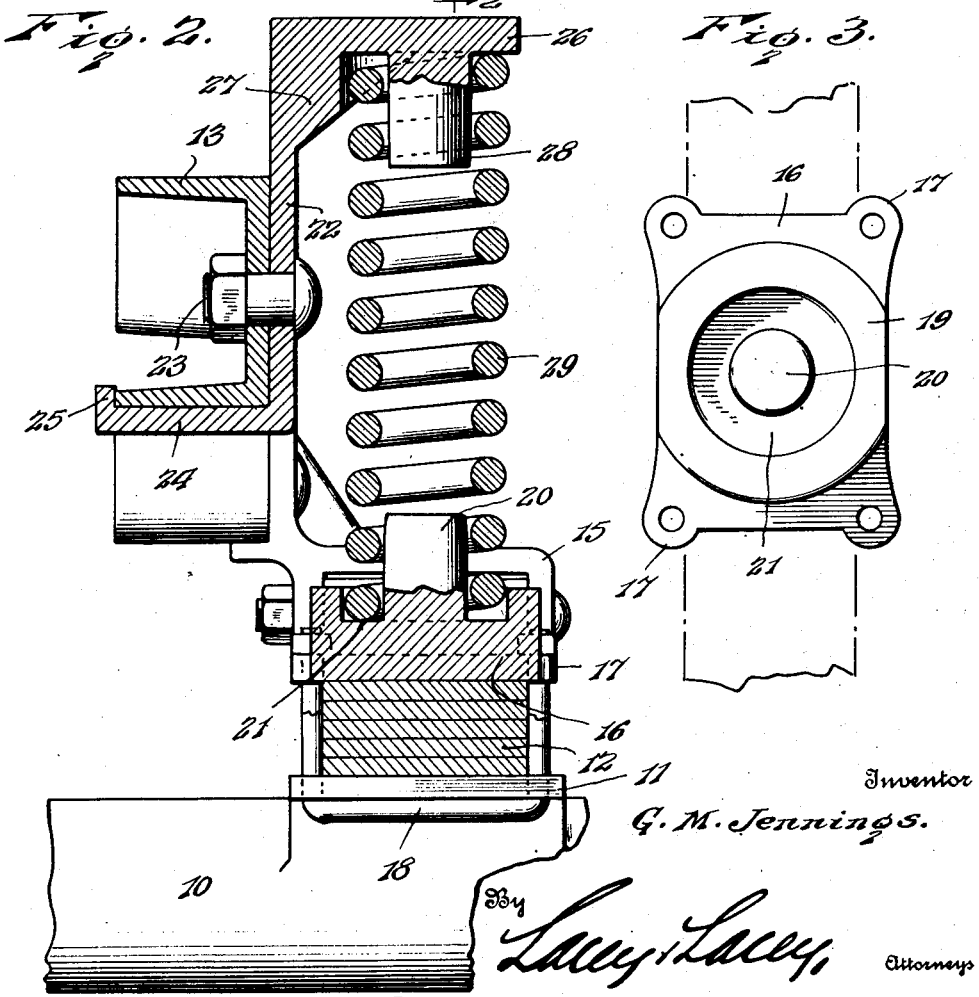
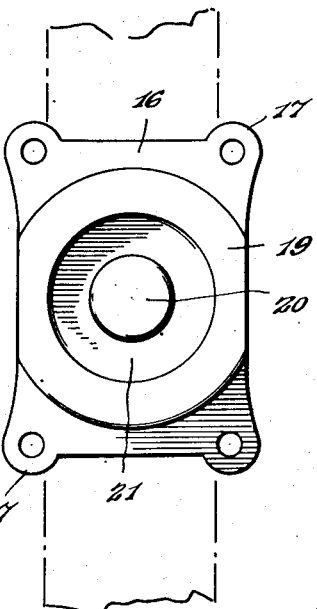
Inventor
G. M. Jennings.
By Lacey & Lacey,
Attorneys Patented June 19, 1934

1,963,440

UNITED STATES PATENT OFFICE 1,963,440

OVERLOAD CUSHIONING DEVICE FOR MOTOR VEHICLES

Gregory M. Jennings, Evansville, Ind., assignor of forty-nine per cent to Judge C. Miller, Evansville, Ind.

Application July 17, 1933, Serial No. 680,830

1 Claim. (Cl. 267—28)

This invention relates to an improved overload cushioning device for motor vehicles, being particularly adapted for use in connection with motor trucks.

The invention seeks, among other objects, to provide a device which will relieve the truck springs of undue strain when the truck is overloaded as well as tend to counteract side sway of the truck body.

The invention seeks, as a further object, to provide a device which will tend to prevent the load from tilting sideways when the truck is rounding a curve and will also tend to hold the load level when the truck is passing over rough roads.

And the invention seeks, as a still further object, to provide a device which will tend to relieve jolting, which will be simple in construction and which may be readily applied.

With the above and other objects in view, the invention consists in certain novel details of construction and combinations of parts hereinafter fully described and claimed, it being understood that various modifications may be resorted to within the scope of the appended claims without sacrificing any of the advantages or departing from the spirit of the invention.

In the accompanying drawing, Figure 1 is a side elevation showing my improved cushioning device in conjunction with the rear axle and one rear spring and the adjacent frame bar of a motor truck, Fig. 2 is an enlarged vertical sectional view on the line 2—2 of Fig. 1, and Fig. 3 is a plan view of the base plate of the device.

Referring now more particularly to the drawing, I have shown the rear axle of a conventional motor truck at 10. This axle carries the usual saddle plates, one of which is indicated at 11, and resting on said plate is one of the rear springs 12 of the truck. One of the side bars of the truck frame is indicated at 13 and connecting the spring at its forward end to said bar is a shackle 14 while, at its rear end, the spring is connected to the bar by a shackle 15.

In accordance with the present improvements, I provide an oblong base plate 16 which is formed at its ends with pairs of ears 17. The plate rests upon the spring 12 at its upper side and extending through the saddle plate 11 and through the ears 17 are the usual U-bolts 18 which, in the present instance, not only serve to connect the spring 12 with the saddle plate but also serve to rigidly secure the base plate 16 in position. The base plate is formed with an upstanding annular flange 19 and rising from the base plate concentrically with respect to said flange is a centering stud 20 defining an annular socket 21 between the stud and flange.

In conjunction with the base plate, I provide a substantially Z-shaped bracket embodying a flat shank 22 which seats flat against the frame bar 13 at its outer side, and extending through said shank and through the vertical web of the frame bar, as particularly seen in Fig. 2, is a bolt 23 rigidly connecting the bracket with the frame bar. At its lower end portion, the shank 22 of the bracket is reduced in width and directed laterally to provide a hook 24 engaging beneath the bottom flange of the frame bar 13 and terminating at its free end in an upstanding flange 25 fitting the inner edge of the bottom flange of the frame bar. Thus, this hook will sustain the major portion of any upward stress on the bracket.

At its upper end, the shank 22 of the bracket is formed with a head plate 26 extending laterally from the shank in a direction opposite to the hook 24, the angle between the head plate and shank being reinforced by a thickened bracing web 27 which extends under the head plate 26 and is formed with extended side portions and has an arcuate outer face as shown in Figures 1 and 2. Depending from the head plate 26 is a centering stud 28 alining with the stud 20 of the base plate 16 and partially encircled by the web 27 to form a seat about the upper end of the stud, and fitting at its lower end in the socket 21 about the stud 20 is a spring 29 the upper end of which surrounds the stud 28 and rests against the head plate 26 with a portion disposed in the seat between the stud and web.

As will now be seen, the spring 29 will function auxiliary to the spring 12 to cushion a load and will tend to prevent tilting when the truck is passing over rough roads. Furthermore, the spring 29 will act on the frame bar 13 to prevent side sway of the truck body, it being understood, of course, that one of my improved cushioning devices is employed in connection with each of the rear springs of the truck. When passing around curves, the spring 29 will also, as will now be appreciated, tend to prevent tilting of the load. I accordingly provide a particularly effective device for the purposes set forth and, as will be seen, a device well adapted for use in connection with conventional motor trucks as now on the market.

Having thus described the invention, I claim:

A cushioning device for motor vehicles including a base plate adapted to be secured upon a vehicle spring over an axle of the vehicle, said base plate being provided with an annular upstanding flange and a centering stud at the center of the base plate spaced from the flange to define an annular socket between the stud and flange, a bracket having a vertical shank provided at its upper end with an outstanding head plate overhanging the base plate and provided with a depending centering stud, the upper end portion of the shank being externally thickened to form a reinforcing web disposed beneath the inner end portion of the head plate and having an arcuate outer surface facing the stud of the head plate and partially encircling the same in spaced relation thereto, the lower end portion of said shank being reduced in width and bent to form an inwardly extending hook adapted to engage beneath a frame bar of a vehicle and terminating in an upstanding lip to bear against the inner edge face of the frame bar, and a coiled cushioning spring between the head plate and base plate and having its upper end encircling the stud of the head plate and bearing against the head plate with a portion engaged between the stud and arcuate outer face of said web, the lower end of said spring encircling the stud of the base plate and seated in the socket between the stud and annular flange of the base plate.

GREGORY M. JENNINGS. [L. S.]